(No Model.)
G. DUNCKER.
Spring Motor.
No. 241,320.  Patented May 10, 1881.
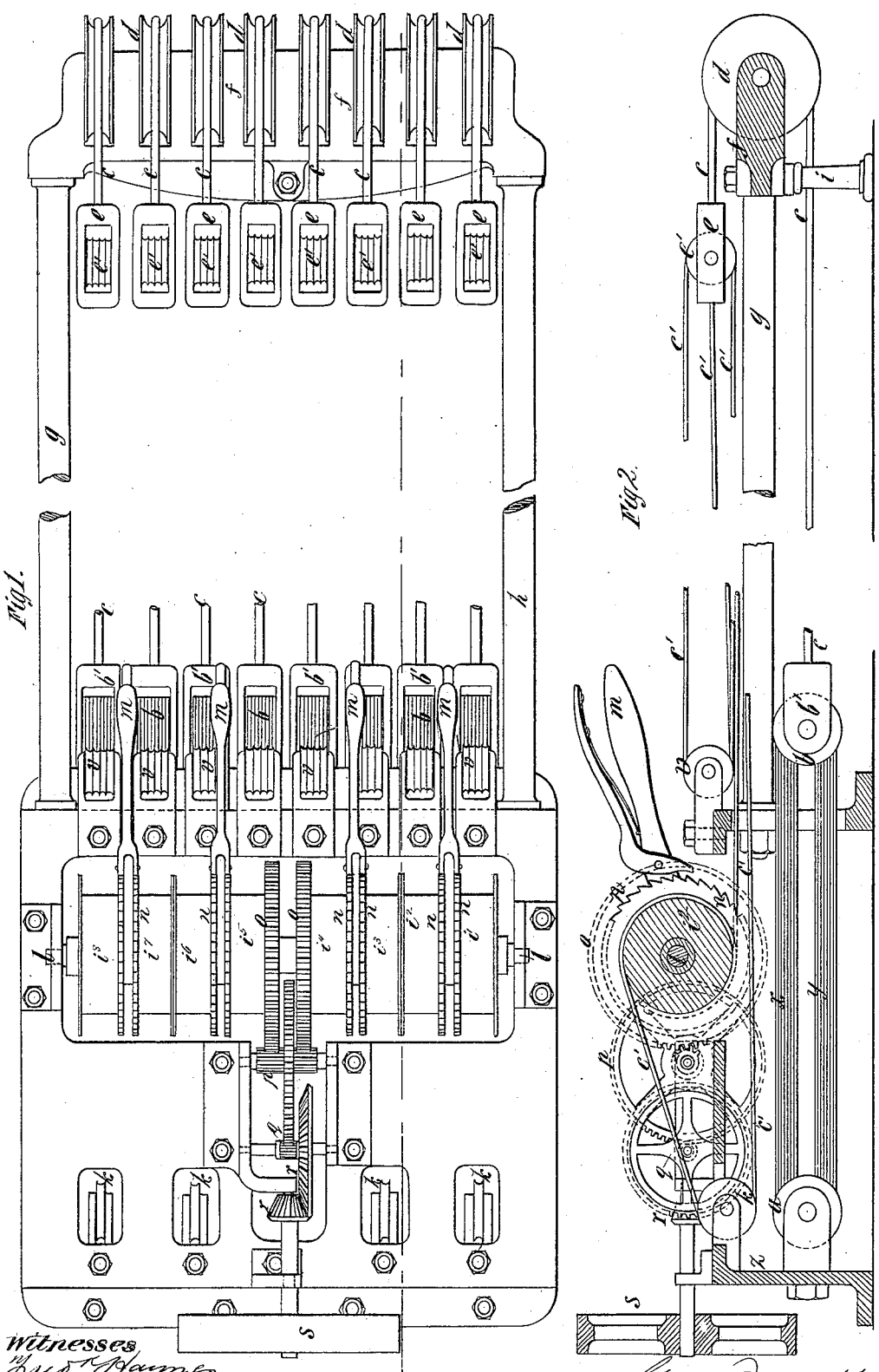

UNITED STATES PATENT OFFICE.

GEORG DUNCKER, OF HAMBURG, GERMANY.

SPRING-MOTOR.

SPECIFICATION forming part of Letters Patent No. 241,320, dated May 10, 1881.

Application filed April 8, 1881. (No model.)

*To all whom it may concern:*

Be it known that I, GEORG DUNCKER, of Hamburg, in the Empire of Germany, have invented certain new and useful Improvements in Spring-Motors, of which the following is a specification.

The object of this invention is to provide a simple and desirable motor driven by the power accumulated by stretching or applying tension to one or more bundles of india-rubber straps. This apparatus may be advantageously used as motive power for driving tools, sewing-machines, boats, and other machines or implements. Each bundle of india-rubber straps is formed by an india-rubber rope or cord of small diameter, which is repeatedly placed around two pulleys, and the ends of which are either connected to each other or fastened to the pulleys. One of the pulleys turns loosely on an axle fastened to the frame of the machine, while the axle of the other pulley is, by means of a bracket, fastened to a rope which is led over a loose pulley attached to the opposite end of the frame of the machine, and the other end of which is connected to a tackle. The rope of this tackle can, by means of a hand-lever or a motor, be wound up on a roller or drums placed in bearings of the machine-frame. By winding up the tackle-rope on this roller the bundle of india-rubber straps is stretched out and kept in stretched position by a ratchet-wheel and pawl, which is in connection with the roller or its axle. The tension of the india-rubber bundle acting to turn the roller can, by means of suitable wheel-work or gearing, be transported to a driving shaft and pulley and produce the rotary motion of said pulley, which motion may be used for driving tools or machines of various kinds.

Instead of using one bundle of india-rubber straps and one roller, several bundles and several rollers may be used and be coupled to drive the wheel-works and driving-shaft, thereby producing an apparatus of greater power.

In the accompanying drawings, Figure 1 represents a plan of a machine for carrying this invention into effect, and Fig. 2 represents a side view and partial section thereof.

Similar letters of reference designate corresponding parts in both figures.

This machine is constructed with eight bundles of india-rubber straps, $xy$, which are formed by placing a fine string, band, or cord of india-rubber around pairs of rollers, $a$ and $b$, the former rollers, $a$, being supported in fixed bearings in the frame $z$ of the machine, while the latter, $b$, are supported in movable bearings $b'$. The straps or bundles are stretched out by means of ropes $c$, fastened to the yokes or bearings $b'$ of rollers $b$, and passed over rollers $d$, that are fastened to part $f$ of the frame, which part $f$ is supported by upright pillar $i$ and horizontal rods or bars $g$ and $h$. The ropes $c$ are connected at their ends with bearing blocks or yokes $e$, carrying rollers $e'$; and $v$ designates a corresponding number of rollers, which are fixed in bearings in the main frame of the machine. The pulleys $e'$ and $v$ have ropes $c'$ passed around them, thus forming a tackle, and the ends of the ropes $c'$ coming from the tackle-pulleys $e'$ $v$ are fastened to drums $i'$ $i^2$ $i^3$ $i^4$ $i^5$ $i^6$ $i^7$ $i^8$, and in such manner that those ropes belonging to drums $i^2$, $i^4$, $i^5$, and $i^7$ are passed directly to corresponding drums, while the ropes belonging to the drums $i'$, $i^3$, $i^6$, and $i^8$ are first each passed over pulleys $k$, supported to the frame, and then carried to the corresponding drums. By this latter arrangement the pressure on shaft $l$ is equalized.

To the drums ratchet-wheels $n$ are fastened. The drums $i$ are placed loose on axle $l$, and by means of levers $m$ and ratchet-wheels $n$ the ropes $c'$ can be wound up upon the drums, and the india-rubber bundles $xy$ be expanded or stretched out. Each lever $m$ is used for turning two neighboring drums. Instead of by hand-power, any other motive power can be used for turning the drums. The motion of the drums is transported to the axle $l$ by means of ratchet-wheels and cams, and from this axle to the driving-pulley $s$ by means of toothed gear $o$ $p$ $q$ $r$.

By giving a parabolic or conical shape to the drums the difference between the power of the expanded bundles of india-rubber may be equalized within certain limits of time during working of the machine.

It will be seen that by the use of my improved apparatus the necessity of a motive agent—such as steam or air—is dispensed with, and the apparatus may be employed in any place without danger of injuring the furniture or surroundings, and furnishes a simple and desirable means of transmitting accumulated or stored-up power to machines of many kinds.

What I claim as my invention, and desire to secure by Letters Patent, is—

1. In a machine for transmitting motive power, the combination, with a roller mounted in stationary bearings and a roller mounted in a movable yoke or bearing, of a band or string of india-rubber wound repeatedly around said rollers, and serving as a means of drawing one roller toward the other when separated, substantially as and for the purpose specified.

2. The combination of elastic rubber bundles $x\ y$, rollers $a\ b$, and tackle $c\ c'\ d\ e\ e'\ v$, all substantially as specified.

3. In a machine for transmitting motive power, the several india-rubber bundles $x\ y$ and rollers $a\ b$, tackle, substantially as herein described, for stretching or applying tension to said bundles, a series of drums mounted on a common main shaft and having the ropes of the several tackle connected to them, a driving-shaft and pulley, and gearing through which motion is imparted from said main to said driving shaft, substantially as specified.

GEORG DUNCKER.

Witnesses:
F. ENGEL,
F. CLAIRMONT.